United States Patent [19]
Inose et al.

[11] 3,780,314
[45] Dec. 18, 1973

[54] VEHICLE COLLISION DETECTING APPARATUS

[75] Inventors: Fumiyuchi Inose, Kokubunji; Tomoji Inui, Katsuta; Sadao Kobayahi, Hachioji; Shotaro Shibata, Tokyo, all of Japan

[73] Assignees: Hitachi, Ltd.; Nissan Motor Co., Ltd., Tokyo, Japan

[22] Filed: Oct. 24, 1972

[21] Appl. No.: 300,225

Related U.S. Application Data

[63] Continuation of Ser. No. 220,661, Jan. 25, 1972, abandoned.

[30] Foreign Application Priority Data

Jan. 28, 1971    Japan................................ 46/2976

[52] U.S. Cl............ 307/121, 307/10 R, 200/61.45, 340/61, 180/82
[51] Int. Cl. ......................................... H01h 35/00
[58] Field of Search................... 335/179, 229, 230; 200/80, 61.45; 340/53, 61, 261, 262; 180/82, 96, 103104; 307/121, 10 R

[56] References Cited
UNITED STATES PATENTS
2,955,470    10/1960    Comuntzis .................. 200/61.45 R
3,493,701    2/1970    Clark .......................... 200/61.45 R FOREIGN PATENTS OR APPLICATIONS
1,256,550    1961    France .......................... 200/61.45 R Primary Examiner—Herman J. Hohauser
Attorney—Paul M. Craig, Jr. et al.

[57]    ABSTRACT

A collision detecting apparatus comprising a sphere of magnetic material normally held stationary by the attractive force of a magnet and a switch adapted to be closed when said sphere of magnetic material is moved overcoming said attractive force by virtue of the force of a collision, wherein the attractive force of said magnet tends to be relatively large under the normal driving conditions of a vehicle, while said attractive force is made to be relatively small by a signal indicative of the occurrence of a collison, whereby the apparatus may not be operated by any noise produced while the vehicle is running, but is capable of positively coming into operation upon the occurrence of a collision.

16 Claims, 7 Drawing Figures

VEHICLE COLLISION DETECTING APPARATUS

This is a continuation, of application Ser. No. 220,661 filed Jan. 25, 1972 now abandoned.

The present invention relates to a collision detecting apparatus for actuating an air bag system designed to protect the occupants of a vehicle, particularly an automotive vehicle upon the occurrence of a collision thereof. More particularly, the present invention relates to a collision detecting apparatus which is capable of accurately detecting for example a collision of an automotive vehicle with an obstacle so that the normal driving of the vehicle will not be prevented by noise other than from a collision, such as vibrations. Here, the term "collision" is meant by both a condition of just after the collision and an anticipative condition of certain collision.

In the past, a number of proposals have been made for protecting the occupants of a vehicle such as an automotive vehicle when the vehicle collides with an object. According to one of these proposals, for example, an air bag which is installed in front of the driver or occupants swells at the instant that the automotive vehicle collides with an object to thereby lessen the force of shock transmitted to the driver or the occupants.

However, in order for these prior art protective systems to be actually installed in automotive vehicles, there have still existed several deficiencies which must be solved. For instance, if the sensitivity of a collision detecting apparatus for detecting a collision of an automotive vehicle to actuate an air bag were high, the air bag would be caused to swell by a vibration other than a collision, such as vibration of the vehicle running on a bad road or the force of shock produced by a sudden stop of the vehicle, thereby preventing the normal driving of the vehicle.

On the other hand, if the sensitivity of such a collision detecting apparatus were low, the air bag would not operate even when the vehicle actually collided with an object thus failing to achieve the object of protecting the occupants of the vehicle. Thus, the previously known protective systems have exhibited deficiencies in this respect either when the sensitivity of the collision detecting apparatus to the force of shock was high or low and therefore the solution of these deficiencies is essential for the application of the known protective systems in practical use.

It is therefore an object of the present invention to provide a collision detecting apparatus capable of accurately detecting a collision of a vehicle such as an automotive vehicle.

It is another object of the present invention to provide a collision detecting apparatus capable of accurately distinguishing a collision of a vehicle from other noises such as the vibration of the vehicle body and the like.

It is a further object of the present invention to provide a collision detecting apparatus which is both simple in construction and inexpensive to manufacture.

To attain these objects, the apparatus of the present invention comprises means for varying the sensitivity to collision of a device for detecting collisions so that the sensitivity is normally held at a relatively low level, while it is raised to a higher level by a signal indicative of the sign of the occurrence of a collision.

According to the apparatus of the invention, the sensitivity of its detecting device can be adjusted to a predetermined level according to the surface conditions of a road, i.e., the vibration of the vehicle body.

The above and other objects, features and advantages of the present invention will be readily apparent from the following detailed descriptions of preferred embodiments when read in conjunction with the accompanying drawings, in which.

Figure 1:
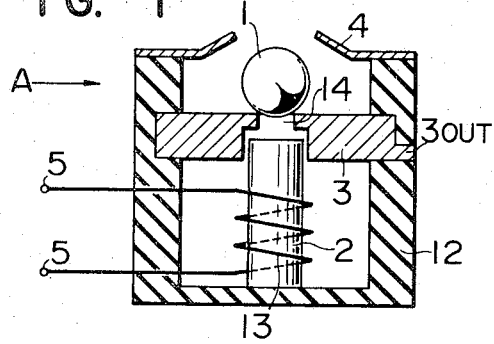
FIG. 1 is a sectional view of a detecting device for explaining the basic principle of the present invention.

The principle of the present invention will now be explained with reference to FIG. 1. In the figure, a supporting plate 3 for supporting a sphere 1 of a magnetic material is mounted in a cylindrical magnet case 12. The surface of the sphere 1 is subjected to a treatment such as plating to deposit thereon a layer of electrically conductive material. A metal such as Au is deposited on the surface of the supporting plate 3 by means of electroplating and its portion $3_{out}$ is exposed to the outside of the case 12 forming an electrode. An aperture 14 is formed through the supporting plate 3 at the center thereof and a portion of a permanent magnet 2 extends into the aperture 14. The sphere 1 is attracted by the permanent magnet 2 so that the sphere 1 is normally held stationary at the center of the supporting plate 3.

Disposed at the upper end of the magnet case 12 is a fixed contact 4 which is plated with a metal such as Au. With the construction described above, if the force of a collision is applied in the direction of an arrow A, the sphere 1 is moved away from its illustrated position in the horizontal direction so that it contacts with the fixed contact 4 causing a flow of current between the plate 3 and the contact 4 and thus permitting the detection of the impact.

The magnetic force of the permanent magnet 2 is suitably determined such that the magnetic sphere 1 is not moved by the force of a collision which is lower than a predetermined level, whereas when the force of a collision higher than said predetermined level is relatively large the sphere 1 is quickly moved toward the fixed contact 4 so as to instantaneously permit a flow of current between the plate 3 and the contact 4, but the sphere 1 is more slowly moved when the force of a collision higher than said predetermined level is relatively small.

The apparatus of the present invention is characterized in that a coil 13 is wound on the permanent magnet 2 and a suitable current is supplied to the coil 13 through terminals 5. The magnetic field produced by the coil 13 is superimposed on the magnetic field produced by the magnet 2 and therefore the attractive force between the magnet 2 and the magnetic sphere 1 can be freely varied. It is to be noted here that in the construction described above the sphere 1 movable in response to the force of a collision may be replaced for example by a pendulum type moving body of magnetic material which is fixed at a portion thereof. The coil 13 may also be wound on a separate yoke (not shown) so that the magnetic fields produced by the coil 13 and the magnet 2 are superimposed one upon another. The apparatus of the present invention incorporates a detecting device of the type described above to thereby positively and highly accurately detect the collision of a vehicle. The present invention will now be explained with reference to the illustrated embodiments.

Figure 2:
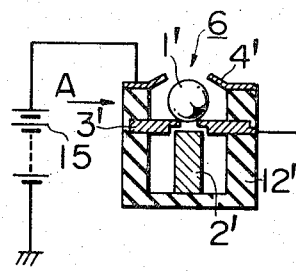
FIGS. 2 and 3 are schematic diagrams showing different embodiments of the present invention.
Figure 2:
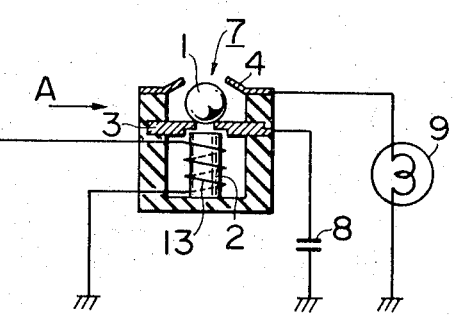

Referring to FIG. 2 illustrating an embodiment of the present invention, numeral 6 designates a form of conventional detecting devices in which the coil 13 of FIG. 1 is not employed and numeral 7 designates a detecting device identical with the one shown in FIG. 1.

The detecting device 7 is constructed such that the attractive force of the permanent magnet 2 in the detecting device 7 becomes greater than that of the detecting device 6. A DC power source 15 is provided between a fixed contact 4' of the detecting device 6 and the ground. An electrode 3' is connected to the coil 13 wound on the permanent magnet 2 of the detecting device 7. On the other hand, an igniter 9 is provided between the fixed contact 4 of the detecting device 7 and the ground and a capacitor 8 is provided between the electrode 3 and the ground. It is so arranged that electrical charge is supplied to the capacitor 8 from a power source which is not shown.

The two detecting devices 6 and 7 are mounted at those portions of an automotive vehicle where they are subjected to substantially the same force of a collision.

With the collision detecting apparatus constructed as described above, if a shock is transmitted to the apparatus in the horizontal direction (in the directions of arrows A), a magnetic sphere 1' of the detecting device 6 is moved establishing a flow of current between the contact 4' and the electrode 3'. Consequently, a current flows from the DC power source 15 to the coil 13 through the contact 4', sphere 1' and electrode 3'. When this occurs, the force attracting the magnetic sphere 1 to the magnet 2 in the detecting device 7 is reduced causing the sphere 1 to move in the horizontal direction and thus establishing a current flow between the electrode 3 and the contact 4. This discharges the charge stored in the capacitor 8 to the igniter 9 by way of the electrode 3, sphere 1 and contact 4 thereby setting off the explosive of the igniter 9. When this occurs, a valve of a container (not shown) containing a compressed gas therein is opened cuasing an air bag to swell.

In this embodiment constructed as described above, the igniter 9 is actuated only when both of the detecting devices 6 and 7 are operated and thus there is the least danger of the air bag being caused to swell by any misoperation inflicting an injury on the driver in the normal condition. Furthermore, even if the detecting device 6 becomes faulty, the application of a stronger force of a collision causes the detecting device 7 to operate singly thus avoiding the possibility of complete inoperativeness of the whole apparatus. In other words, the apparatus operates in a so-called fail-soft manner.

Figure 4:
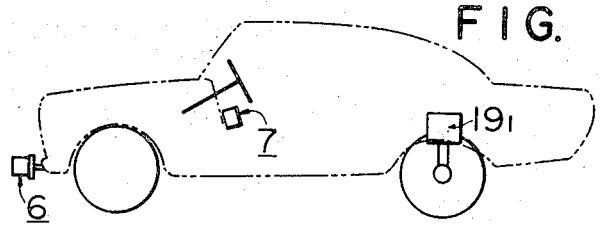
FIGS. 4 and 5 are schematic diagrams of automotive vehicles showing the manner in which the apparatus of the present invention is installed therein.

In the actual installation of the detecting devices 6 and 7 on an automotive vehicle, as shown in FIGS. 4, the detecting device 6 is preferably installed at a front part position of the vehicle such as at the front fender portion and the detecting device 7 is preferably installed at a position in the rear of the detecting device 6 such as in the vicinity of the dash board.

In this way, the detecting device 6 is enabled to detect the occurrence of a collision preceeding the detecting device 7. It should be noted that a similar effect can be obtained by a modified form of the construction of FIG. 2 in which a current is normally supplied to the coil 13 so that the magnetic force of the magnet 2 and that of the coil 13 are in the same direction and the supply of the current is interrupted upon the occurrence of a collision.

Figure 3:
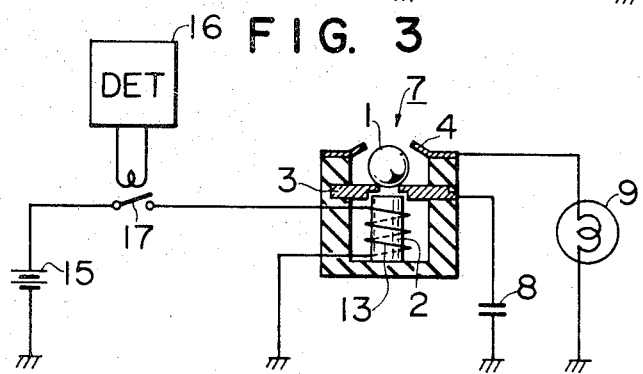

Referring now to FIG. 3, there is shown another embodiment of the present invention wherein the supply of current to the coil 13 is switched on in response to a sign of the occurrence of a collision of a vehicle.

More particularly, in the figure numeral 16 designates a detector for detecting a sign of the occurrence of a collision which may be of the type that detects an object quickly approaching to the front of the vehicle according to the principle such as is employed in a radar. The detector may be of another type that detects an approaching object through the use of the Doppler effect of sound waves.

In fact, devices of the above types which are designed to detect a quickly approaching object and produce an output accordingly are known in the prior art.

When the detector 16 produces an output in the manner described above, a switch 17 is closed supplying a current from the power source 15 to the coil 13 with the result that the magnetic field thus produced cancels a portion of the magnetic field produced by the permanent magnet 2. In other words, the sensitivity of the detecting device 7 is improved. Thus, the detecting device 7 positively operates in response to the force of a collision of the vehicle.

On the other hand, if the shock is due to a mere noise and not caused by a collision of the vehicle, there is no sign of such a collision and thus the detector 16 produces no output so that the sensitivity of the detecting device 7 is maintained at a low level and thus there is less danger of causing misoperation.

In addition, if the detector 16 becomes faulty or fails to operate due to its failure in detecting a sign of the occurrence of a collision, the detecting device 7 operates singly provided that the shock is not due to a mere noise and it is large enough. In other words, the apparatus of this embodiment also operates in a so-called fail-soft manner.

Figure 5:
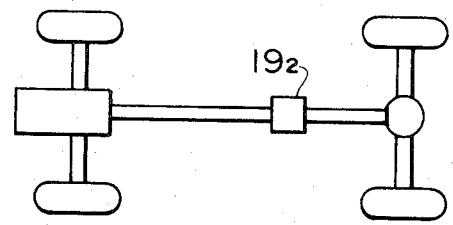
Figure 6:
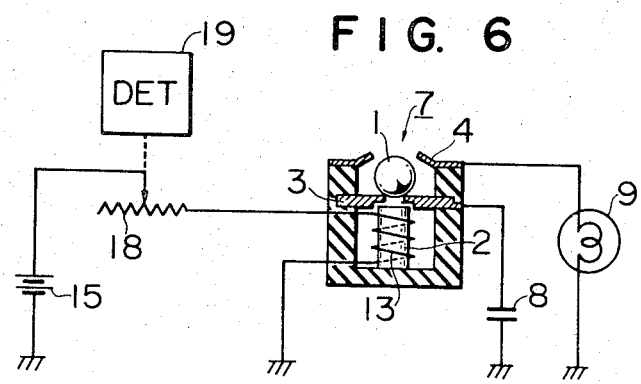
FIG. 6 is a schematic diagram showing a further embodiment of the present invention.

FIG. 6 illustrates a further embodiment of the present invention. In the figure, numeral 19 designates a detector for detecting the driving conditions of an automotive vehicle, such as the load of the vehicle, vehicle speed and steady state amplitude of vibration. When for example the speed of a vehicle is to be detected, the detector 19 may be installed at a position designated as $19_1$ in FIG. 4 so as to be operatively associated with the wheels, while the detector 19 may be installed at a suitable place of the lower part of the vehicle body such as at $19_2$ in FIG. 5 when the amplitude of vibration is to be detected. Of course, the detector 19 may be suitably installed at any position other than those shown in FIGS. 4 and 5. It is also evident that detectors of the type designed to detect the aforesaid conditions of autmotive vehicles are known in the prior art.

The output from the detector 19 is used to adjust the resistance value of a variable resistor 18 provided between the power source 15 and the coil 13. The variable resistor 18 may be of a type whose resistance value can be continuously varied or of another type whose resistance value can be varied stepwise.

According to this embodiment constructed as described above, the sensitivity of the detecting device 7 can be varied according to the driving conditions of a vehicle and thus the detection of a collision can be suitably effected according to the driving conditions.

For example, since at vehicle speeds below a certain limit the danger of the occurrence of collision is relatively less, control is possible so that the resistance value of the variable resistor 18 is increased to thereby lower the sensitivity of the detecting device 7.

On the other hand, where the surface condition of a road is rough so that the vibration of the vehicle body tends to be large, the resistor 18 can be adjusted to lower the sensitivity of the detecting device 7 and thus prevent it from being operated by a noise signal due to the vibration.

While in the embodiments described hereinbefore the magnetic sphere 1 has been explained as disposed in a horizontal plane so that it is movable in all directions in the plane through 360°, the sphere 1 can also be constructed so that the sphere 1 has sensitivity only in a given direction. For this purpose, a pendulum type moving body fixed at a portion thereof may for example be employed effectively in place of the magnetic sphere 1.

Figure 7:
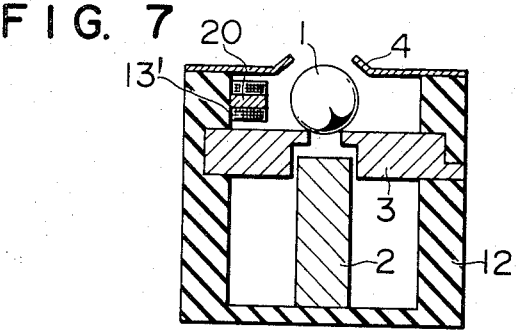
FIG. 7 is a sectional view showing another embodiment of the detecting device incorporated in the apparatus of the present invention.

The construction shown in FIG. 7 wherein, in addition to the permanent magnet 2 for attracting and holding the magnetic sphere 1 stationary, a yoke 20 is mounted on the side wall of the magnet case 12 and a sensitivity adjusting coil 13' wound around the yoke 20, is also effective in providing the magnetic sphere 1 with a desired directional sensitivity. In other words, in the detecting device shown in FIG. 7, a signal indicative of a sign of the occurrence of a collision causes a current flow from the DC power source to the coil 13' thereby making the magnetic sphere 1 readily movable towards the coil. This means that the sensitivity of movement of the sphere 1 with respect to the force of a collision is improved in one direction.

It should be appreciated that while the collision detecting apparatus described hereinbefore can be effectively employed for detecting collisions of automotive vehicles, they can also be applied in the detection of collisions of other vehicles. Moreover, the moving body movable in response to the force of a collision may be formed into any shape other than a sphere.

What is claimed is:

1. A vehicle collision tetecting apparatus comprising a magnet, a movable body of a magnetic material normally held stationary by the attractive force existing between said magnet and said magnetic body, means for detecting the displacement of said magnetic body when said magnetic body is moved overcoming said attractive force, a coil for producing a magnetic field superimposed on the magnetic field of said magnet exerting said attractive force, current supply means for supplying current to said coil, and means for controlling the supply of current from said current supply means to said coil in response to the occurrence of a collision.

2. A collision detecting apparatus according to claim 1, wherein the direction of current flowing through said coil is selected in such a manner that the magnetic field produced by said coil and the magnetic field produced by said magnet are opposite in direction to each other.

3. A collision detecting apparatus according to claim 1, wherein said current supply controlling means comprises detecting means for detecting a sign of the occurrence of a collision, and switching means for closing the electric circuit between said current supply means and said coil in response to the output from said detecting means.

4. A collision detecting apparatus according to claim 1, wherein said current supply controlling means comprises means for detecting the driving conditions of a vehicle, and means for controlling the value of current supplied from said current supply means to said coil in response to the output from said detecting means.

5. A collision detecting apparatus comprising a magnet case, a permanent magnet disposed in said magnet case in such a manner that a magnetic field due to said permanent magnet is produced in the vertical direction, a sphere of magnetic material having an electrically conductive layer formed on the surface thereof, a supporting plate for supporting said sphere in such a manner that said sphere is held stationary at a predetermined position by the magnetic force of said magnet and movable in the horizontal direction in response to the force of a collision, at least that portion of the surface of said supporting plate contacting said sphere being formed of an electrically conductive material, a fixed contact mounted on said magnet case in such a manner as to contact with said sphere when said sphere is moved a predetermined distance from said stationary position, a coil wound and disposed in said magnet case to exert an adjustable magnetic force on said magnetic sphere, and current supply means for supplying current to said coil.

6. A collision detecting apparatus according to claim 5, wherein said coil for producing an adjustable magnetic force is wound on said permanent magnet, and current is supplied from said current supply means to said coil in such a direction that the magnetic force of said coil and the magnetic force of said permanent magnet are opposite in direction with each other.

7. A collision detecting apparatus according to claim 6, wherein switching means adapted to be closed by a signal indicative of a sign of the occurrence of a collision is connected between said current supply means and said coil.

8. A collision detecting apparatus according to claim 7, wherein said switching means comprises a magnet case, a permanent magnet disposed in said magnet case such that a magnetic field due to said permanent magnet is produced in the vertical direction, a sphere of magnetic material having an electrically conductive layer formed on the surface thereof, a supporting plate for supporting said sphere in such a manner that said sphere is held stationary at a predetermined position by the magnetic force of said magnet and movable in the horizontal direction in response to the force of a collision, at least that portion of the surface of said supporting plate contacting said sphere being formed of an electrically conductive material, and a fixed contact mounted on said magnet case so as to contact with said sphere when said sphere is moved a predetermined distance from said stationary position.

9. A collision detecting apparatus according to claim 5, wherein said coil for producing an adjustable magnetic force is wound on a yoke provided on the side wall of said magnet case such that a magnetic field produced by said coil acts in the horizontal direction to said magnetic sphere.

10. A collision detecting apparatus according to claim 5, wherein a variable resistor is connected between said current supply means and said coil to vary the amount of current supplied to said coil.

11. A collision detecting apparatus according to claim 10, wherein the resistance value of said variable resistor is changed according to the driving conditions of a vehicle such as the vibration of the vehicle body or the speed of the vehicle.

12. A collision detecting apparatus according to claim 1, wherein the direction of current flow through said coil is selected such that a magnetic field produced by said coil acts in the same direction as the magnetic field produced by said magnet.

13. A collision detecting apparatus comprising a permanent magnet, a body of a magnetic material normally held stationary at a predetermined position by a holding force of the horizontal direction due to a magnetic field produced by said permanent magnet, a coil for producing a magnetic field to exert a holding force of the same direction as said holding force of said permanent magnet to said magnetic body individually from said permanent magnet, current supply means for supplying current to said coil, detecting means for detecting a sign of the occurrence of a collision to interrupt the supply of current from said current supply means to said coil, and switching means adapted to be closed in response to the displacement of said magnetic body when said magnetic body is moved overcoming said holding forces of said permanent magnet and said coil.

14. A collision detecting apparatus comprising a body of a magnetic material having an electrically conductive layer formed on the surface thereof to serve as a movable contact electrode, a fixed contact electrode disposed opposite to said magnetic body, permanent magnet means for exerting a holding force of the horizontal direction to said magnetic body in such a manner that said magnetic body is held stationary at a predetermined position apart from said fixed contact electrode, coil means for exerting a holding force of the horizontal direction to said magnetic body individually from said permanent magnet means in such a manner that said magnetic body is held stationary at said predetermined position, current supply means for supplying current to said coil means, and detecting means for detecting a sign of the occurrence of a collision to control the supply of current from said current supply means to said coil means.

15. A collision detecting apparatus according to claim 13, wherein said detecting means comprises a radar adapted to be operated when an object quickly approaches to the front of a vehicle.

16. A collision detecting apparatus according to claim 14, wherein said current supply means comprises means for controlling the value of current supplied from said current supply means to said coil means in response to the driving conditions of a vehicle.

* * * * *